United States Patent
Xu et al.

(10) Patent No.: US 10,306,511 B2
(45) Date of Patent: May 28, 2019

(54) METHOD AND APPARATUS FOR OPTIMIZING UE-AMBR FOR DUAL CONNECTIVITY IN WIRELESS COMMUNICATION SYSTEM

(71) Applicant: LG ELECTRONICS INC., Seoul (KR)

(72) Inventors: Jian Xu, Seoul (KR); Daewook Byun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 72 days.

(21) Appl. No.: 15/510,951

(22) PCT Filed: Oct. 22, 2015

(86) PCT No.: PCT/KR2015/011192
§ 371 (c)(1),
(2) Date: Mar. 13, 2017

(87) PCT Pub. No.: WO2016/064215
PCT Pub. Date: Apr. 28, 2016

(65) Prior Publication Data
US 2017/0280348 A1    Sep. 28, 2017

Related U.S. Application Data

(60) Provisional application No. 62/066,919, filed on Oct. 22, 2014, provisional application No. 62/162,650, (Continued)

(51) Int. Cl.
*H04W 28/02* (2009.01)
*H04W 92/20* (2009.01)
*H04W 8/18* (2009.01)

(52) U.S. Cl.
CPC ......... *H04W 28/0257* (2013.01); *H04W 8/18* (2013.01); *H04W 28/0268* (2013.01); *H04W 28/0278* (2013.01); *H04W 92/20* (2013.01)

(58) Field of Classification Search
CPC ... H04W 72/0446; H04W 4/70; H04W 36/22; H04W 72/1252
See application file for complete search history.

(56) References Cited

U.S. PATENT DOCUMENTS

| | | | |
|---|---|---|---|
| 2013/0188527 A1* | 7/2013 | Yang | H04W 28/22 370/259 |
| 2014/0241317 A1* | 8/2014 | Jamadagni | H04L 5/0032 370/331 |

(Continued)

OTHER PUBLICATIONS

3rd Generation Partnership Project (3GPP), "Technical Specification Group Radio Access Network; Study on Small cell enhancements for E-UTRA and E-UTRAN; Higher layer aspects (Release 12)," 3GPP TR 36.842 V12.0.0, Dec. 2013, 71 pages.

(Continued)

*Primary Examiner* — Hashim S Bhatti
(74) *Attorney, Agent, or Firm* — Lee, Hong, Degerman, Kang & Waimey

(57) ABSTRACT

A method and apparatus for deciding a secondary eNB (SeNB) user equipment aggregate maximum bit rate (UE-AMBR) in a wireless communication system is provided. In one embodiment, a master evolved NodeB (MeNB) in dual connectivity receives assistant information, which includes at least one of a buffer size or load information of a SeNB, from the SeNB, and decides whether to change a SeNB UE-AMBR based on the assistant information. In another embodiment, the MeNB transmits an indication which requests change of a SeNB UE-AMBR to a SeNB, receives information related to a new SeNB UE-AMBR from the SeNB; and decides whether to change the SeNB UE-AMBR based on the information related to the new SeNB UE-AMBR.

4 Claims, 14 Drawing Sheets

Related U.S. Application Data filed on May 15, 2015, provisional application No. 62/237,600, filed on Oct. 6, 2015.

(56) References Cited

U.S. PATENT DOCUMENTS

| | | | | |
|---|---|---|---|---|
| 2014/0254476 | A1* | 9/2014 | Blankenship | H04L 47/20 370/328 |
| 2015/0264612 | A1* | 9/2015 | Baek | H04W 12/04 370/331 |
| 2016/0345190 | A1* | 11/2016 | Chen | H04W 24/02 |
| 2018/0115921 | A1* | 4/2018 | Chen | H04W 28/0257 |

OTHER PUBLICATIONS

3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," 3GPP TS 36.300 V12.3.0, Sep. 2014, 216 pages.

NEC, "TP for SeNB on UE-AMBR: UE-Associated Information—36A13," 3GPP TSG-RAN WG3 #85bis, R3-142348, Oct. 2014, 17 pages.

Alcatel-Lucent Shanghai Bell, "Coordination of UE AMBR in dual connectivity," 3GPP TSG-RAN WG3 #85bis, R3-142359, Oct. 2014, 5 pages.

PCT International Application No. PCT/KR2015-011192, Written Opinion of the International Searching Authority dated Mar. 25, 2016, 3 pages.

\* cited by examiner

METHOD AND APPARATUS FOR OPTIMIZING UE-AMBR FOR DUAL CONNECTIVITY IN WIRELESS COMMUNICATION SYSTEM

CROSS-REFERENCE TO RELATED APPLICATIONS

This application is the National Stage filing under 35 U.S.C. 371 of International Application No. PCT/KR2015/011192, filed on Oct. 22, 2015, which claims the benefit of U.S. Provisional Application No. 62/066,919, filed on Oct. 22, 2014, 62/162,650, filed on May 15, 2015, and 62/237,600, filed on Oct. 6, 2015, the contents of which are all hereby incorporated by reference herein in their entirety.

BACKGROUND OF THE INVENTION

Field of the Invention

The present invention relates to wireless communications, and more particularly, to a method and apparatus for optimizing a user equipment aggregate maximum bit rate (UE-AMBR) for dual connectivity in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity has been discussed. Dual connectivity is used to refer to operation where a given user equipment (UE) consumes radio resources provided by at least two different network points connected with non-ideal backhaul. Furthermore, each eNB involved in dual connectivity for a UE may assume different roles. Those roles do not necessarily depend on the eNB's power class and can vary among UEs. Dual connectivity may be one of potential solutions for small cell enhancement.

A UE can be connected to more than one packet data network (PDN). For example, a UE may be connected to PDN 1 for Internet, and PDN 2 for voice over Internet protocol (VoIP) using IP multimedia subsystem (IMS). The UE has one unique IP address for each of its all PDN connections. Here, UE aggregate maximum bit rate (AMBR) (uplink (UL)/downlink (DL)) indicates the maximum bandwidth allowed for all the non-guaranteed bit rate (GBR) evolved packet system (EPS) bearers associated to the UE, no matter how many PDN connections the UE has. Other PDNs are connected through other PDN gateways (P-GWs), this parameter is applied by eNBs only.

A method for optimizing UE-AMBR for dual connectivity may be required.

SUMMARY OF THE INVENTION

The present invention provides a method and apparatus for optimizing a user equipment aggregate maximum bit rate (UE-AMBR) for dual connectivity in a wireless communication system. The present invention provides a method and apparatus for optimizing a UE-AMBR on a secondary evolved NodeB (SeNB) side in dual connectivity. The present invention provides a method and apparatus for deciding, by a master eNB (MeNB) in dual connectivity, whether to change a UE-AMBR for SeNB or not.

In an aspect, a method for deciding, by a master evolved NodeB (MeNB) in dual connectivity, a secondary eNB (SeNB) user equipment aggregate maximum bit rate (UE-AMBR) in a wireless communication system is provided. The method includes receiving assistant information, which includes at least one of a buffer size or load information of a SeNB, from the SeNB, and deciding whether to change a SeNB UE-AMBR based on the assistant information.

In another aspect, a method for deciding, by a master evolved NodeB (MeNB) in dual connectivity, a secondary eNB (SeNB) user equipment aggregate maximum bit rate (UE-AMBR) in a wireless communication system is provided. The method includes transmitting an indication which requests change of a SeNB UE-AMBR to a SeNB, receiving information related to a new SeNB UE-AMBR from the SeNB, and deciding whether to change the SeNB UE-AMBR based on the information related to the new SeNB UE-AMBR.

UE-AMBR for dual connectivity can be optimized.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
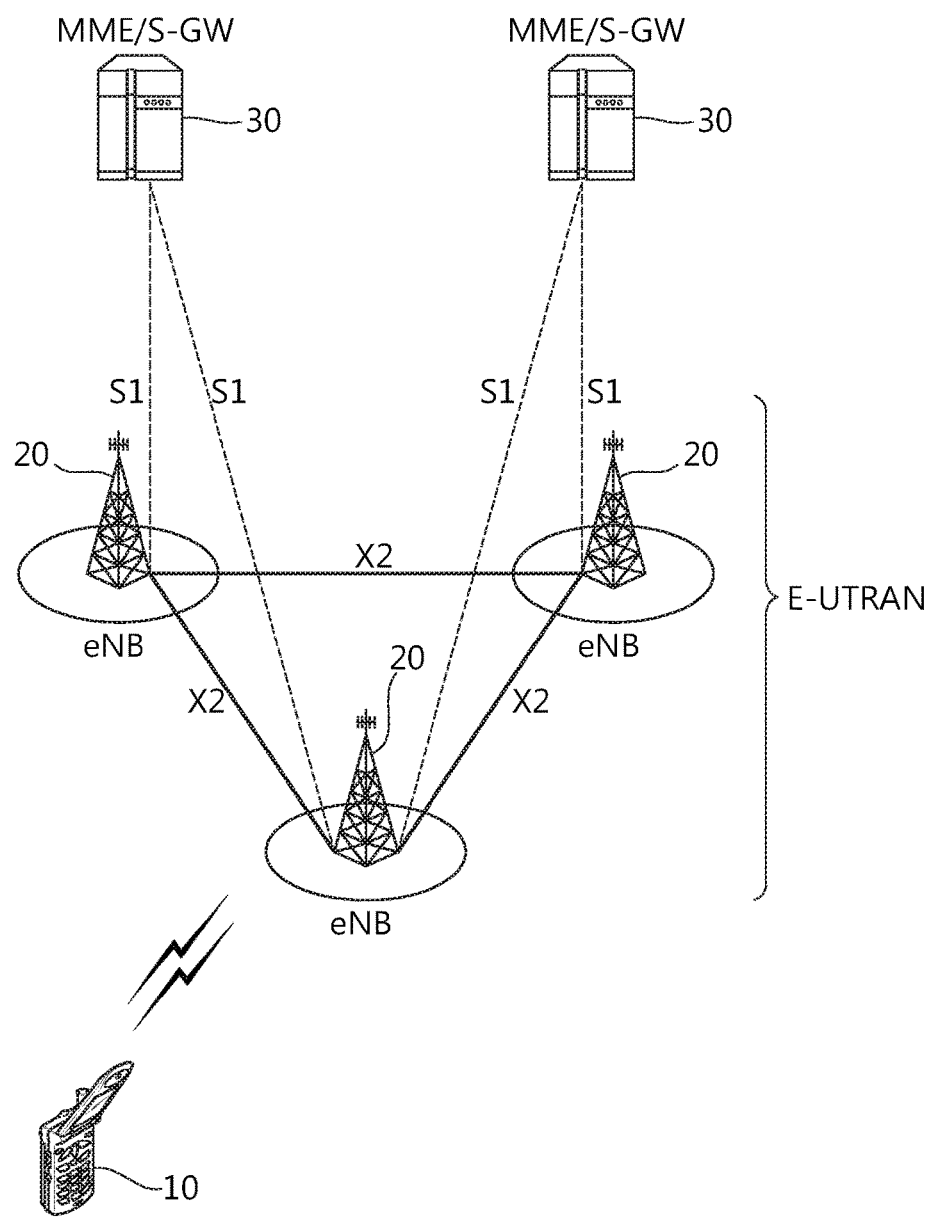
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an S1 interface.

Figure 2:
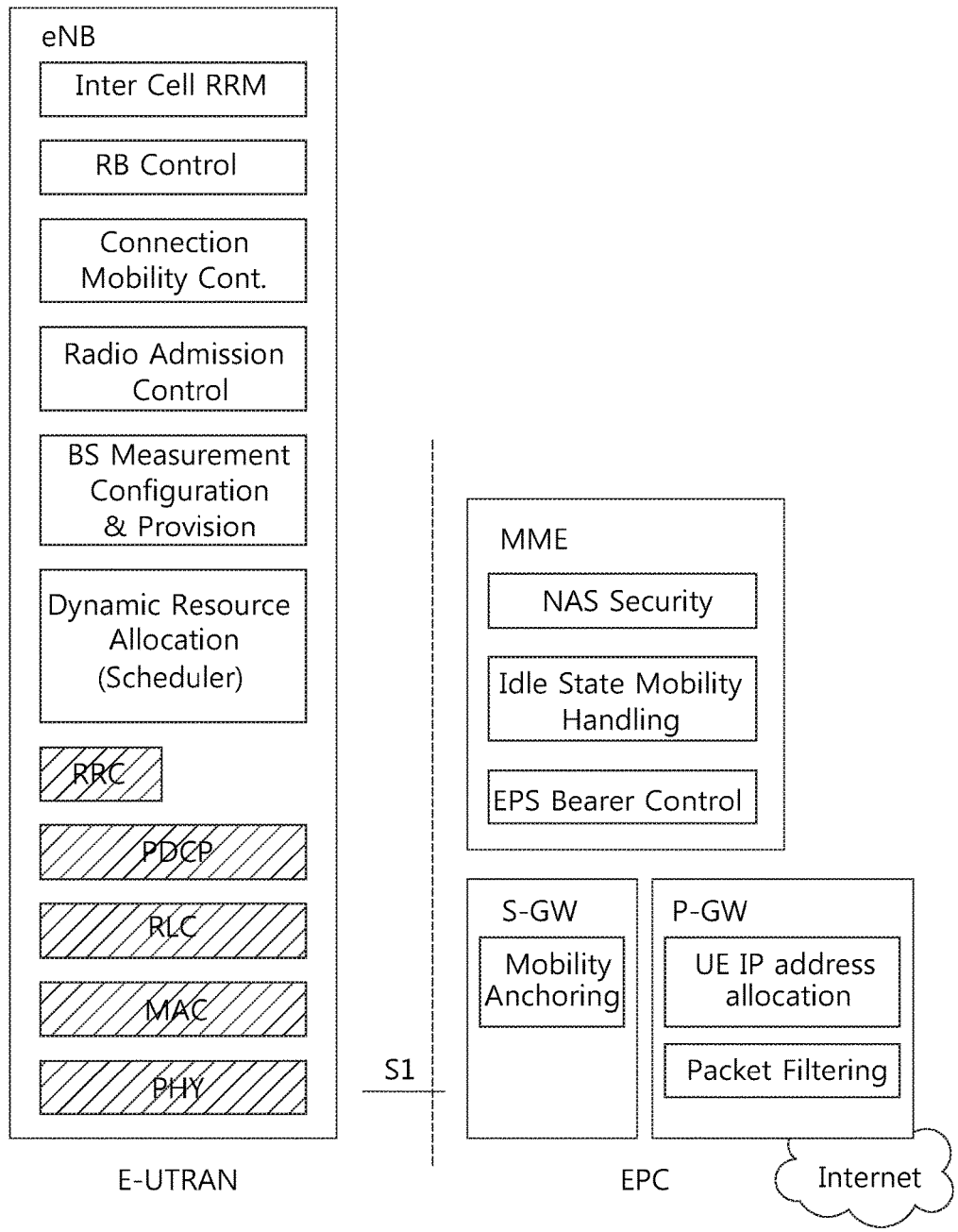
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
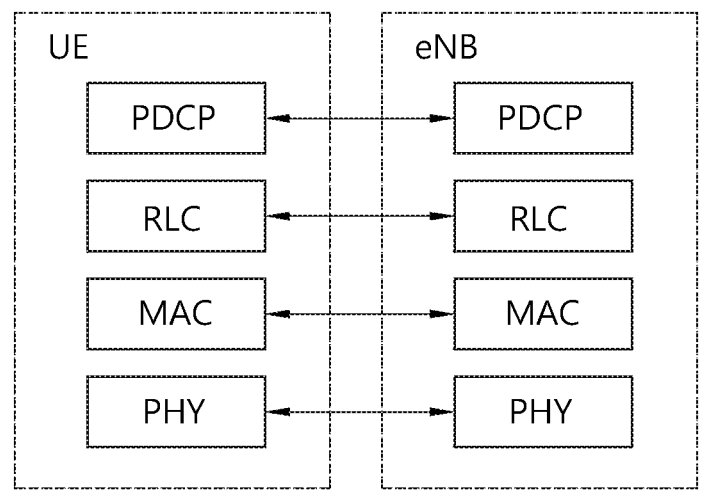
FIG. 3 shows a block diagram of a user plane protocol stack of an LTE system.
Figure 4:
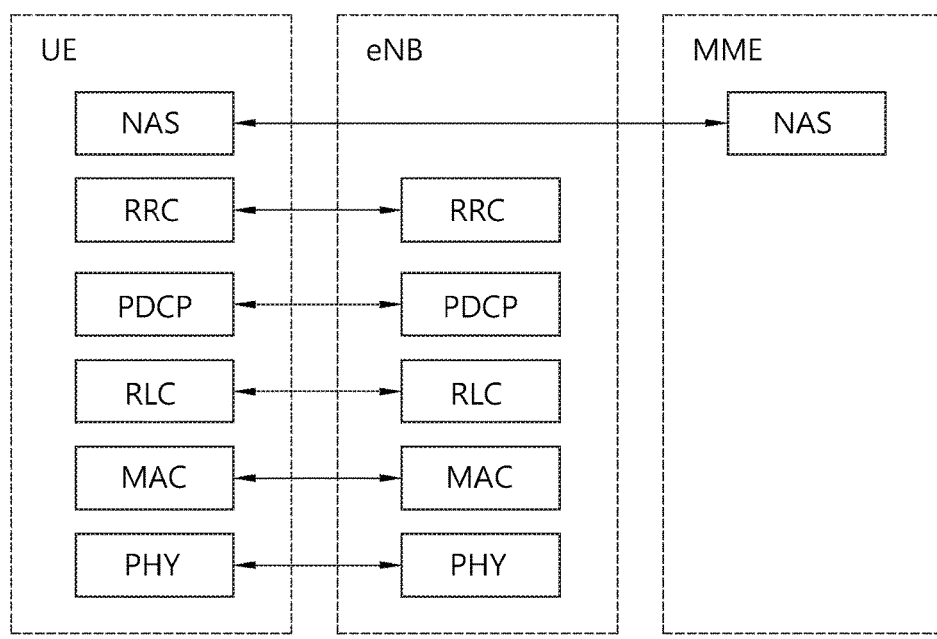
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or IPv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
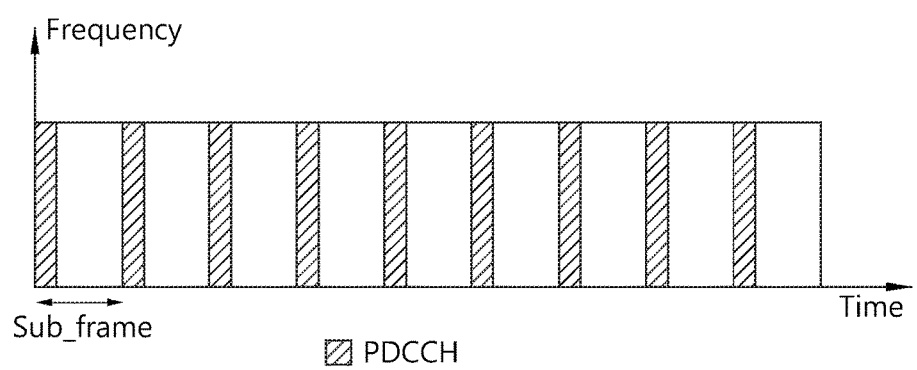
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, a uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Overall architecture and network interface for dual connectivity (DC) is described. It may be referred to 3GPP TR 36.842 V12.0.0 (2013-12). The E-UTRAN supports dual connectivity operation whereby a multiple RX/TX UE in RRC_CONNECTED is configured to utilize radio resources provided by two distinct schedulers, located in two eNBs connected via a non-ideal backhaul over the X2 interface. The overall E-UTRAN architecture described in FIG. 1 is applicable for dual connectivity as well. Two different roles may be assumed to eNBs involved in dual connectivity for a certain UE: an eNB may either act as a master eNB (MeNB) or as a secondary eNB (SeNB). The MeNB is the eNB which terminates at least S1-MME in dual connectivity. The SeNB is the eNB that is providing additional radio resources for the UE but is not the MeNB in dual connectivity. In dual connectivity a UE is connected to one MeNB and one SeNB.

Figure 6:
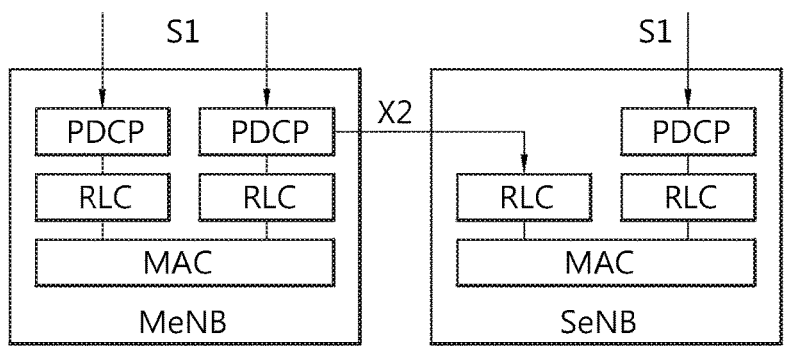
FIG. 6 shows radio protocol architecture for dual connectivity.

FIG. 6 shows radio protocol architecture for dual connectivity. In DC, the radio protocol architecture that a particular bearer uses depends on how the bearer is setup. Three alternatives exist, master cell group (MCG) bearer, secondary cell group (SCG) bearer and split bearer. Referring to FIG. 6, those three alternatives are depicted, i.e. in order of the MCG bearer, split bearer and SCG bearer from left to right. The MCG bearer is a bearer whose radio protocols are only located in the MeNB to use MeNB resources only in dual connectivity. The SCG bearer is a bearer whose radio protocols are only located in the SeNB to use SeNB resources in dual connectivity. The split bearer is a bearer whose radio protocols are located in both the MeNB and the SeNB to use both MeNB and SeNB resources in dual connectivity. Signaling radio bearers (SRBs) are always of the MCG bearer and therefore only use the radio resources provided by the MeNB. The MCG is a group of serving cells associated with the MeNB, comprising of the primary cell (PCell) and optionally one or more secondary cells (SCells) in dual connectivity. The SCG is a group of serving cells associated with the SeNB, comprising of primary SCell (PSCell) and optionally one or more SCells in dual connectivity. DC may also be described as having at least one bearer configured to use radio resources provided by the SeNB.

Figure 7:
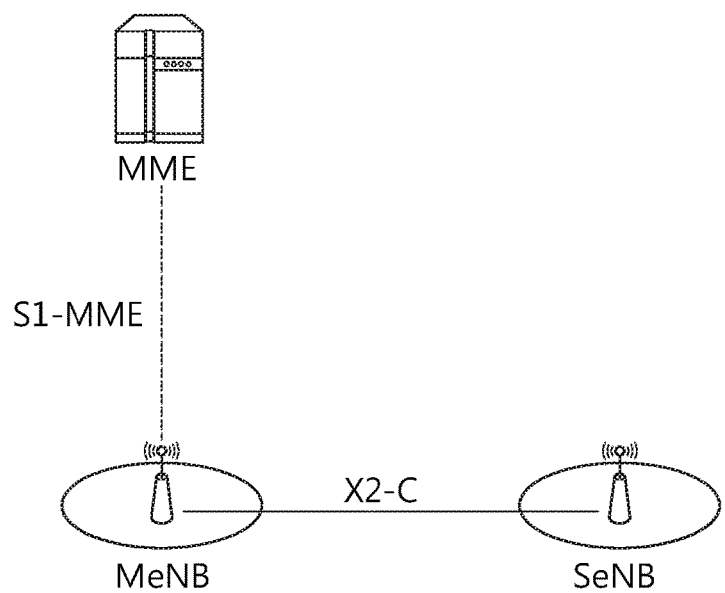
FIG. 7 shows C-plane connectivity of eNBs involved in dual connectivity for a certain UE.

FIG. 7 shows C-plane connectivity of eNBs involved in dual connectivity for a certain UE. Inter-eNB control plane signaling for dual connectivity is performed by means of X2 interface signaling. Control plane signaling towards the MME is performed by means of S1 interface signaling. There is only one S1-MME connection per UE between the MeNB and the MME. Each eNB should be able to handle UEs independently, i.e. provide the PCell to some UEs while providing SCell(s) for SCG to others. Each eNB involved in dual connectivity for a certain UE owns its radio resources and is primarily responsible for allocating radio resources of its cells, respective coordination between MeNB and SeNB is performed by means of X2 interface signaling. Referring to FIG. 7, the MeNB is C-plane connected to the MME via S1-MME, the MeNB and the SeNB are interconnected via X2-C.

Figure 8:
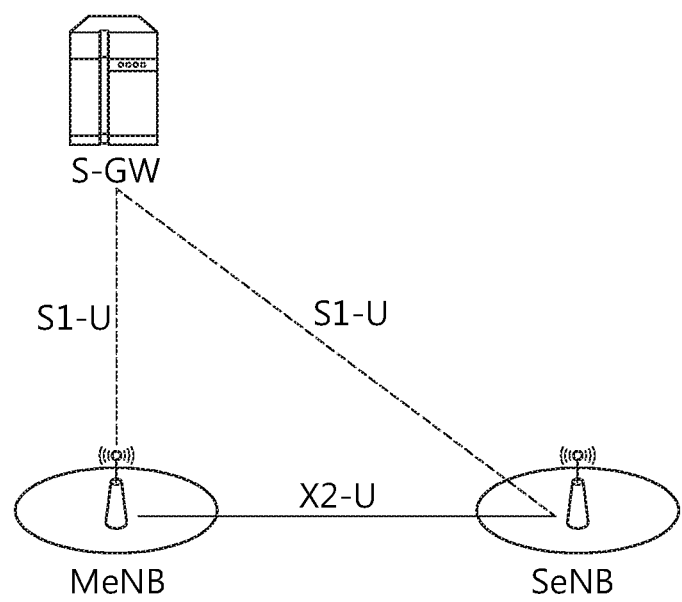
FIG. 8 shows U-plane connectivity of eNBs involved in dual connectivity for a certain UE.

FIG. 8 shows U-plane connectivity of eNBs involved in dual connectivity for a certain UE. U-plane connectivity depends on the bearer option configured. For MCG bearers, the MeNB is U-plane connected to the S-GW via S1-U, the SeNB is not involved in the transport of user plane data. For split bearers, the MeNB is U-plane connected to the S-GW via S1-U and in addition, the MeNB and the SeNB are interconnected via X2-U. For SCG bearers, the SeNB is directly connected with the S-GW via S1-U. If only MCG and split bearers are configured, there is no S1-U termination in the SeNB.

Figure 9:
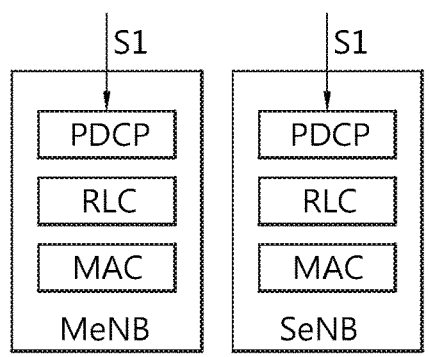
FIG. 9 shows an example of U-plane architecture for dual connectivity.

FIG. 9 shows an example of U-plane architecture for dual connectivity. U-plane architecture for dual connectivity shown in FIG. 9 is the combination of S1-U that terminates in SeNB and independent PDCPs (no bearer split). U-plane architecture for dual connectivity shown in FIG. 9 may be called "Architecture 1A".

Figure 10:
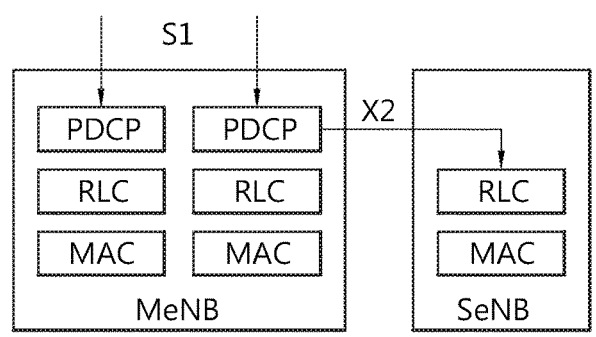
FIG. 10 shows another example of U-plane architecture for dual connectivity.

FIG. 10 shows another example of U-plane architecture for dual connectivity. U-plane architecture for dual connectivity shown in FIG. 10 is the combination of S1-U that terminates in MeNB, bearer split in MeNB, and independent RLCs for split bearers. U-plane architecture for dual connectivity shown in FIG. 10 may be called "Architecture 3C".

The UE aggregate maximum bit rate (UE-AMBR) is limited by a subscription parameter stored in the home subscriber server (HSS). The MME shall set the UE-AMBR to the sum of the access point name AMBR (APN-AMBR) of all active APNs up to the value of the subscribed UE-AMBR. The UE-AMBR limits the aggregate bit rate that can be expected to be provided across all non-guaranteed bit rate (GBR) bearers of a UE (e.g. excess traffic may get discarded by a rate shaping function). Each of those Non-GBR bearers could potentially utilize the entire UE-AMBR, e.g. when the other non-GBR bearers do not carry any traffic. The E-UTRAN enforces the UE-AMBR in uplink and downlink.

Based on the current agreement for dual connectivity, the UE-AMBR is partitioned into two parts, i.e. MCG UE-AMBR (or, MeNB UE-AMBR) and SCG UE-AMBR (or, SeNB UE-AMBR). The total value of MCG UE-AMBR and SCG UE-AMBR should remain constant and be equal to the UE-AMBR. The MeNB may be in charge of ensuring that the UE-AMBR does not exceed the sum of the MCG UE-AMBR and SCG UE-AMBR. The MeNB is in charge of ensuring that it does not allocate more resources than the MCG UE-AMBR and the SeNB is in charge of ensuring that it does not allocate more resources than the SCG UE-AMBR.

The MeNB decides the initial split of the MCG UE-AMBR and SCG UE-AMBR and indicates the decided SCG UE-AMBR to the SeNB via the SeNB Addition Request message. But, the initial split of the MCG UE-AMBR and SCG UE-AMBR may not be the most suitable due to change of radio and load conditions. According to change of radio and load conditions, two possible consequences may occur.

If the SeNB cannot serve the current SCG UE-AMBR (i.e. initial SCG UE-AMBR), the MeNB may unnecessary limit itself at the MCG UE-AMBR resulting in an overall suboptimal bit rate delivered to the end user.

Instead, even though the SeNB can serve a higher bit rate than the current SCG UE-AMBR, the MeNB does not know it which either result in a suboptimal bit rate delivered to the UE or unnecessary loading to the MeNB.

In order to solve the problem described above, the following solutions have been discussed.

(1) Option 1: The SeNB may propose a new SCG UE-AMBR to the MeNB at any time which the MeNB can accept or refuse to apply.

(2) Option 2: The SeNB may propose a new SCG UE-AMBR to the MeNB at any time which the MeNB always accepts in order to take into account the best contribution that the SeNB can propose at any time.

(3) Option 3: The SeNB may propose a new SCG UE-AMBR to the MeNB at any time, and the MeNB may select any intermediate value between the current SCG UE-AMBR and the new UE-AMBR proposed by the SeNB.

(4) Option 4: The SeNB may report the arriving data rate to the MeNB, and the MeNB may take into account the arriving data rate and reconfigure the SCG UE-AMBR.

In the solutions described above, option 1, 2 and 3 corresponds to a case that the SeNB proposes a new SCG UE-AMBR to the MeNB, and option 4 corresponds to a case that the SeNB only provides assistant information for the MeNB to decide the new SCG UE-AMBR. Hereinafter, based on the various options described above, a method for optimizing UE-AMBR on the SeNB side according to an embodiment of the present invention is described.

Figure 11:
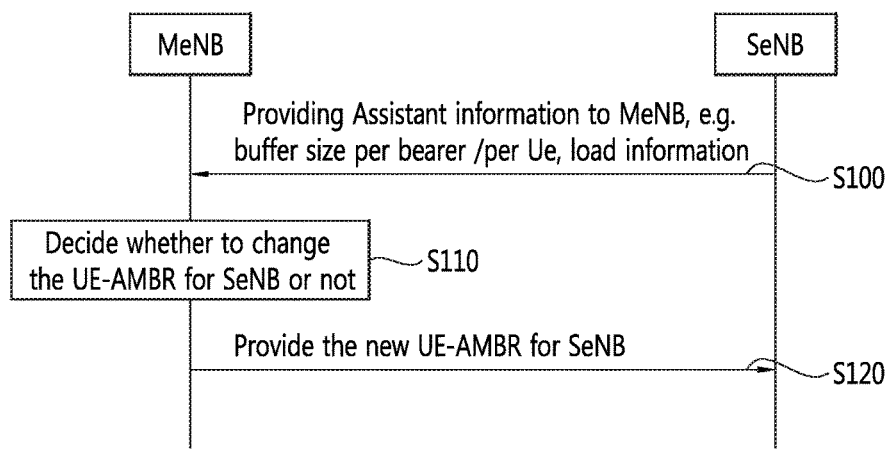
FIG. 11 shows a method for deciding a SeNB UE-AMBR according to an embodiment of the present invention.

FIG. 11 shows a method for deciding a SeNB UE-AMBR according to an embodiment of the present invention. This embodiment is based on option 4 described above, i.e. the SeNB provides the arriving data rate to the MeNB, and the MeNB decide whether to change the SeNB UE-AMBR. But since only the arriving data rate is not enough for the MeNB to make a decision to change the SeNB UE-AMBR, according to this embodiment, further assistant information may be provided to the MeNB.

In step S100, the MeNB receives assistant information, which includes at least one of a buffer size or load information of a SeNB, from the SeNB, in order to help the MeNB make a decision on whether to change SeNB UE-AMBR. The assistant information may be provided in addition to the arriving data rate of the SeNB. The buffer size may be configured per bearer and/or per UE. The assistant information may be received via a message, e.g. a new message or an existing message.

In step S110, the MeNB decides whether to change a SeNB UE-AMBR based on the assistant information. The MeNB may decide whether to change a current SeNB UE-AMBR further based on at least one of buffer status, load status of the MeNB or UE's quality of service (QoS), etc.

In step S120, the MeNB may transmit a changed SeNB UE-AMBR to the SeNB. The changed SeNB UE-AMBR may be transmitted via a message, e.g. a new message or an existing message.

In the procedure described above, steps S100 and S120 may be a class 1 procedure. Alternatively, step S100 may be a class 2 procedure and step S120 may be realized by other existing message.

Figure 12:
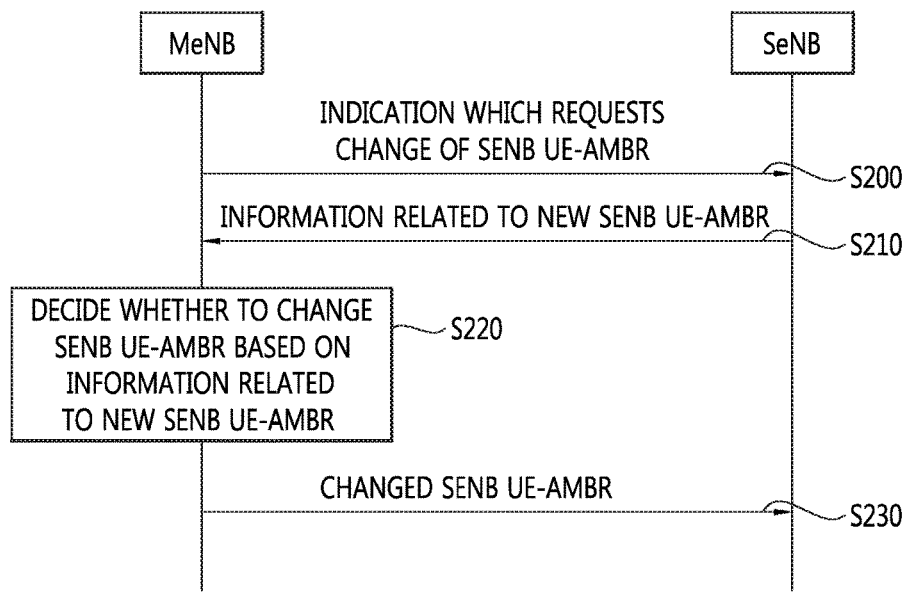
FIG. 12 shows a method for deciding a SeNB UE-AMBR according to another embodiment of the present invention.

FIG. 12 shows a method for deciding a SeNB UE-AMBR according to another embodiment of the present invention. This embodiment is based on options 1 to 4 described above, i.e. the SeNB proposes a new SCG UE-AMBR to the MeNB but the MeNB decides whether to change the SeNB UE-AMBR. According to this embodiment, the MeNB triggers the procedure to change the SeNB UE-AMBR.

In step S200, the MeNB triggers a procedure by transmitting an indication which requests change of a SeNB UE-AMBR to a SeNB. By the indication, the SeNB may guess that the MeNB may request the change of the SeNB UE-AMBR. The indication may be realized by adding the total UE-AMBR of the UE. The indication may be transmitted via a SeNB Modification Request message or a new message or other existing message.

In step S210, the MeNB receives information related to a new SeNB UE-AMBR from the SeNB. The information related to a new SeNB UE-AMBR may be the assistant information, which may include at least one of the arriving bit rate, buffer status or load status. Alternatively, the information related to a new SeNB UE-AMBR may be the new SeNB UE-AMBR which is proposed by the SeNB based on information available at the SeNB. Alternatively, the information related to the new SeNB UE-AMBR may include both the new SeNB UE-AMBR proposed by the SeNB and the assistant information, which may include at least one of the arriving bit rate, buffer status or load status. The information related to a new SeNB UE-AMBR may be received via a SeNB Modification Required message.

In step S220, the MeNB decides whether to change the SeNB UE-AMBR based on the information related to the new SeNB UE-AMBR. More specifically, upon receiving the assistant information as the information related to the new SeNB UE-AMBR, the MeNB may decide whether to change the SeNB UE-AMBR based on the assistant information. Alternatively, upon receiving the new SeNB UE-AMBR proposed by the SeNB as the information related to the new SeNB UE-AMBR, the MeNB may decide whether to admit the new proposed SeNB UE-AMBR. Alternatively, upon receiving both the new SeNB UE-AMBR proposed by the SeNB and the assistant information, which may include at least one of the arriving bit rate, buffer status or load status, as the information related to the new SeNB UE-AMBR, the MeNB may decide how to change the SeNB UE-AMBR. In step S230, the MeNB transmits a changed SeNB UE-AMBR to the SeNB. The changed SeNB UE-AMBR may be transmitted via a SeNB Modification Confirm message.

Figure 13:
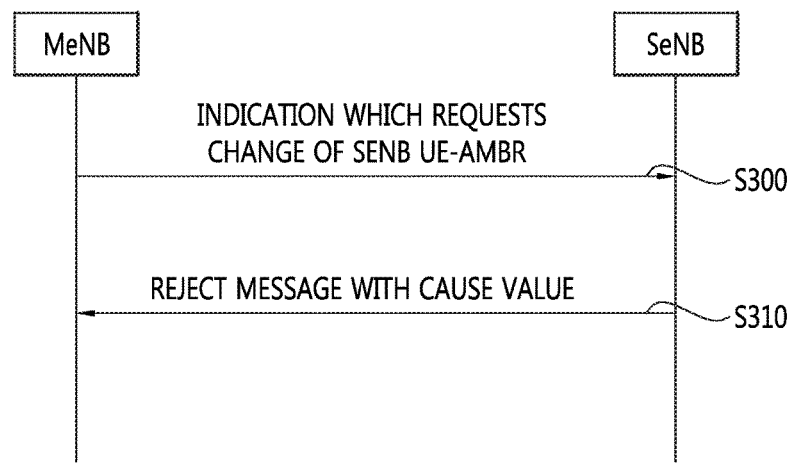
FIG. 13 shows a method for deciding a SeNB UE-AMBR according to another embodiment of the present invention.

FIG. 13 shows a method for deciding a SeNB UE-AMBR according to another embodiment of the present invention. According to this embodiment, the MeNB triggers the procedure to change the SeNB UE-AMBR, but the SeNB may reject it if it is over requested.

In step S300, the MeNB triggers a procedure by transmitting an indication which requests change of a SeNB UE-AMBR to a SeNB. By the indication, the SeNB may guess that the MeNB may request the change of the SeNB UE-AMBR. The indication may be realized by adding the total UE-AMBR of the UE. The indication may be transmitted via a SeNB Modification Request message or a new message or other existing message.

In step S310, the SeNB rejects the request by transmitting a reject message with cause value to the MeNB. The reject message may be a SeNB Modification Request Reject message. The cause value may be an existing one or a new one.

Figure 14:
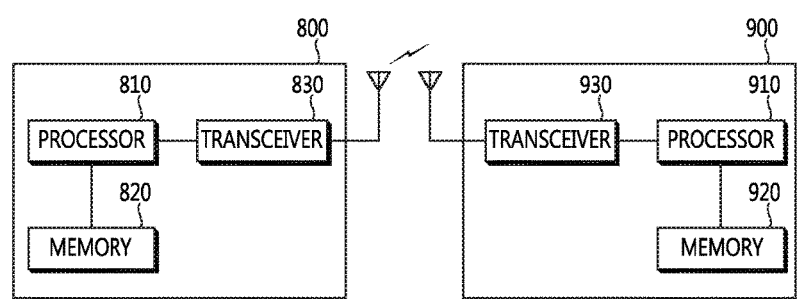
FIG. 14 shows a wireless communication system to implement an embodiment of the present invention.

FIG. 14 shows a wireless communication system to implement an embodiment of the present invention.

A MeNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A SeNB 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for deciding, by a master evolved NodeB (MeNB) in dual connectivity, a secondary eNB (SeNB) user equipment aggregate maximum bit rate (UE-AMBR) in a wireless communication system, the method comprising:
    transmitting a SeNB Modification Request message for requesting a change of the SeNB UE-AMBR, to a SeNB;
    in response to the SeNB Modification Request message for requesting the change of the SeNB UE-AMBR, receiving load status of the SeNB for a new SeNB UE-AMBR, from the SeNB;
    changing the SeNB UE-AMBR to the new SeNB UE-AMBR, based on the load status of the SeNB; and
    transmitting the new SeNB UE-AMBR to the SeNB.

2. The method of claim 1, wherein the load status of the SeNB for the new SeNB UE-AMBR is received via a SeNB Modification Required message.

3. The method of claim 1, wherein the new SeNB UE-AMBR is transmitted via a SeNB Modification Confirm message.

4. The method of claim 1, further comprising:
    receiving the new SeNB UE-AMBR proposed by the SeNB, from the SeNB.

* * * * *